(12) United States Patent
Eul et al.

(10) Patent No.: US 10,053,822 B2
(45) Date of Patent: Aug. 21, 2018

(54) CONSTRUCTION MACHINE WITH NETWORK FOR DATA TRANSMISSION

(71) Applicant: JOSEPH VOEGELE AG, Lugwigshafen/Rhein (DE)

(72) Inventors: Achim Eul, Mannheim (DE); Michael Heindtel, Mannheim (DE)

(73) Assignee: JOSEPH VOEGELE AG (DE)

( * ) Notice: Subject to any disclaimer, the term of this patent is extended or adjusted under 35 U.S.C. 154(b) by 0 days.

(21) Appl. No.: 15/084,899

(22) Filed: Mar. 30, 2016

(65) Prior Publication Data
US 2016/0289902 A1  Oct. 6, 2016

(30) Foreign Application Priority Data
Mar. 30, 2015 (EP) ..................................... 15161661

(51) Int. Cl.
*E01C 19/22* (2006.01)
*H04L 12/10* (2006.01)
(Continued)

(52) U.S. Cl.
CPC .............. *E01C 19/22* (2013.01); *E01C 19/48* (2013.01); *G07C 5/02* (2013.01); *G07C 5/0841* (2013.01);
(Continued)

(58) Field of Classification Search
CPC ...... E01C 19/002; E01C 19/004; E01C 19/22; E01C 19/34; E01C 19/407; E01C 19/42;
(Continued)

(56) References Cited

U.S. PATENT DOCUMENTS

| 5,908,459 A | * | 6/1999 | Rower | .................... E01C 19/48 404/84.1 |
| 8,961,064 B2 | * | 2/2015 | Ramos | .................... E01C 19/42 404/118 |

(Continued)

FOREIGN PATENT DOCUMENTS

| CN | 101056782 A | 10/2007 |
| CN | 101936211 A | 1/2011 |

(Continued)

OTHER PUBLICATIONS

European Search Report dated Sep. 7, 2015, Application No. EP 15 16 1661, 3 Pages.
(Continued)

*Primary Examiner* — Thomas G Black
*Assistant Examiner* — Ce Li Li
(74) *Attorney, Agent, or Firm* — Brooks Kushman P.C.

(57) ABSTRACT

The disclosure relates to a construction machine with a paving screed to install a road surface, whereby the construction machine is a self-propelled road paver and comprises at least one power line for power supply of at least one electric consumer of the paving screed and whereby the construction machine contains a network for data transmission between at least one sender integrated in the network and at least one receiver integrated in the network. Furthermore, according to the disclosure, at least one section of the power line is integrated in the network and configured for data transmission between the sender and the receiver.

16 Claims, 3 Drawing Sheets

(51) Int. Cl.
*H04L 12/40* (2006.01)
*G07C 5/02* (2006.01)
*G07C 5/08* (2006.01)
*E01C 19/48* (2006.01)

(52) U.S. Cl.
CPC .............. *H04L 12/10* (2013.01); *H04L 12/40* (2013.01); *E01C 2301/10* (2013.01); *H04L 2012/40215* (2013.01); *H04L 2012/40273* (2013.01)

(58) Field of Classification Search
CPC .. E01C 19/48; E01C 19/4833; E01C 19/4853; E01C 23/06; E01C 2301/10; E01C 2301/14; G05B 19/042; G05B 2219/25323; G05B 2219/25132; G07C 5/02; G07C 5/0841; H04B 2203/547; H04B 3/548; H04B 2203/5412; H04L 12/10; H04L 12/40; H04L 2012/40215; H04L 2012/40273
See application file for complete search history.

(56) References Cited

U.S. PATENT DOCUMENTS

| | | | | |
|---|---|---|---|---|
| 9,068,295 | B2* | 6/2015 | Rutz | E01C 19/00 |
| 2006/0076830 | A1* | 4/2006 | Hair, III | H04B 3/54 |
| | | | | 307/1 |
| 2006/0097852 | A1* | 5/2006 | Lammers | G05B 19/042 |
| | | | | 340/286.01 |
| 2006/0097864 | A1* | 5/2006 | Lammers | G05B 19/042 |
| | | | | 340/538.11 |
| 2007/0088858 | A1* | 4/2007 | Eul | E01C 19/48 |
| | | | | 710/10 |
| 2007/0210898 | A1* | 9/2007 | Berglund | G05B 19/042 |
| | | | | 340/286.01 |
| 2009/0257825 | A1* | 10/2009 | Nelson | E01C 19/48 |
| | | | | 404/95 |
| 2010/0207744 | A1* | 8/2010 | Lammers | G05B 19/042 |
| | | | | 340/12.32 |
| 2010/0326067 | A1* | 12/2010 | Weiser | E02F 9/226 |
| | | | | 60/329 |
| 2011/0123267 | A1* | 5/2011 | Buschmann | E01C 19/407 |
| | | | | 404/72 |
| 2011/0229263 | A1* | 9/2011 | Buschmann | E01C 19/002 |
| | | | | 404/72 |
| 2011/0236131 | A1* | 9/2011 | Heindtel | E01C 19/48 |
| | | | | 404/83 |
| 2012/0288328 | A1* | 11/2012 | Minich | E01C 19/1063 |
| | | | | 404/72 |
| 2014/0064847 | A1* | 3/2014 | Graham | E01C 19/48 |
| | | | | 404/72 |
| 2015/0254911 | A1* | 9/2015 | Kimura | G06F 1/18 |
| | | | | 701/50 |

FOREIGN PATENT DOCUMENTS

| | | | | |
|---|---|---|---|---|
| EP | 233158 | A1 | 6/2011 | |
| JP | H0620127 | A | 1/1994 | |
| JP | H09221714 | A | 8/1997 | |
| JP | 2003129413 | A | 5/2003 | |
| JP | 2008520171 | A | 6/2008 | |
| JP | 2011196174 | A | 10/2011 | |
| JP | 2014129695 | A | 7/2014 | |
| JP | WO2015025370 | A1 | 3/2017 | |
| WO | WO-0201745 | A1 * | 1/2002 | .............. H04B 3/54 |
| WO | 2006053100 | A1 | 5/2006 | |

OTHER PUBLICATIONS

Japanese Office Action dated Mar. 31, 2017, Application No. 2016-053512, 5 Pages.
Chinese First Office Action dated Dec. 19, 2017, Application No. 201610183323.8, Applicant Joseph Fu Gele Company, 8 Pages.

* cited by examiner

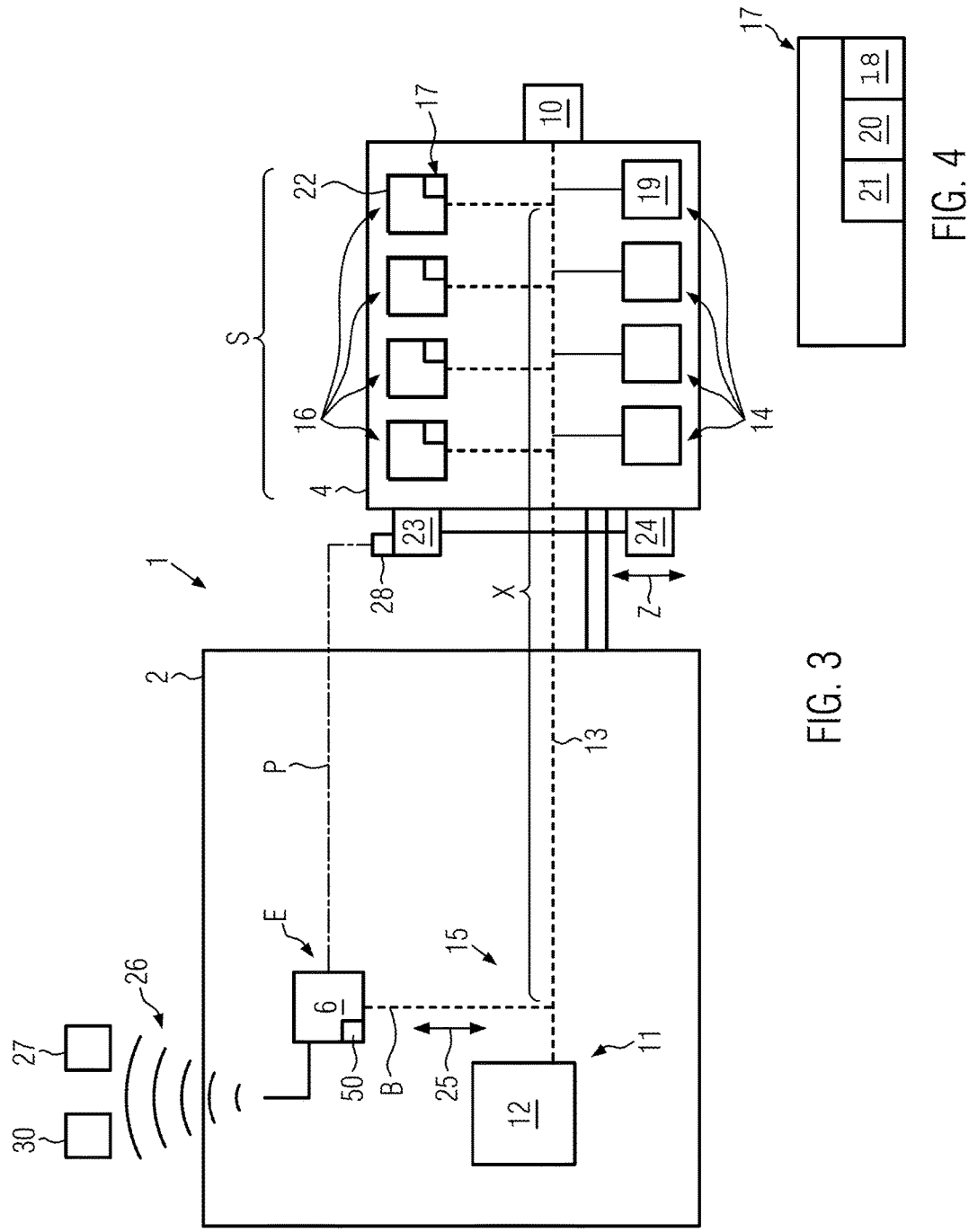

CONSTRUCTION MACHINE WITH NETWORK FOR DATA TRANSMISSION

CROSS-REFERENCE TO RELATED APPLICATIONS

This application claims foreign priority benefits under 35 U.S.C. § 119(a)-(d) to European patent application number EP 15161661.2, filed Mar. 30, 2015, which is incorporated by reference in its entirety.

TECHNICAL FIELD

The disclosure relates to a construction machine with a network for data transmission. Furthermore, the disclosure relates to the use of a part of a power line of a construction machine for data transmission.

BACKGROUND

In practice, self-propelled road pavers are used to produce new road surfaces. Such road pavers are usually equipped with a material hopper that is used to take up the paving mix. The paving mix is transported by means of a conveyor system during the installation drive to a paving screed fastened on the road paver that transforms the paving mix into a new road surface layer.

Modern paving screed types comprise a plurality of electric as well as hydraulic consumers. For example, there can be electric paving screed heating units that are fed by a generator of the road paver via a power line, in particular with alternating current. The generator is preferably driven by a combustion engine of the road paver, in most cases by a diesel engine. Furthermore, there can in particular be hydraulic tamper stroke adjustment units, hydraulically controllable paving screed extending units to broaden the working area as well as, and without being restricted to such, hydraulically adjustable lateral sliders on the paving screed.

In addition, there is already now a plurality of electric and hydraulic components on the paving screed that are functionally integrated in a data network of the road paver and that can be activated by means of a control module that is in particular disposed on the operating stand of the road paver. Alternatively or in addition, the electric and/or hydraulic units of the paving screed can also be activated from an operating stand of the paving screed that is disposed directly, preferably laterally, on the paving screed.

However, it became apparent that, due to the increasing number of electric as well as hydraulic components/consumers on the paving screed, besides the installation work for the power supply, also the complexity of the data cables used to monitor and activate the power supply increases accordingly. This leads in particular to increased manufacturing costs, whereby maintenance works on the road paver also become more complicated.

SUMMARY

With regard to the abovementioned challenges, the purpose of the present disclosure is to improve a construction machine by means of simple, technically constructive features in a way that, in spite of the increasing complexity of functional units that arises on it, functional components can be connected on a network of the road paver with a reduced data cable use for a robust and reliable data transmission. The purpose of the disclosure also is to create a use of the construction machine in line with such conditions.

The disclosure relates to a construction machine with a paving screed for the installation of a road surface. The construction machine is formed as a self-propelled road paver and comprises at least one power line for the power supply of at least one electric consumer of the paving screed.

The construction machine further comprises a network for a data transmission between at least one sender integrated in the network and at least one receiver integrated in the network. Thereby, the sender is in particular designed to send at least one type of operating parameters of the road paver through the network to the receiver.

According to the disclosure, at least one section of the power line is integrated in the network and configured for data transmission between the sender and the receiver.

Consequently, the power line for the power supply of at least one electric consumer on the paving screed, which exists on the road paver anyway, is integrated at least in a sectional way in the network for data transmission between actuators connected therein as an integral functional part. The network, which is used in the disclosure for data transmission between the sender and the receiver, consequently uses at least one section of the power line for data transmission. Hence, this section that is jointly used by the power line and the network has the double function of feeding power to the consumer as well as being used for data transmission in the network.

Due to the condition that a part of the feed line in the disclosure is itself designed as a communication section for the data connection, the disadvantages described above in connection with the state of the art can be reduced to a minimum because particularly maintenance works become easier and also the manufacturing work, in particular during assembly of the road paver, is reduced.

The electric consumer is preferably a paving screed heating device of the paving screed that is connected to a generator of the construction machine via a power line. The paving screed heating device is configured to bring parts of the paving screed before or during the installation of surfacing material to a defined temperature as well as to keep such temperature constant during installation if needed so that the surfacing material will not stick to the heated parts of the paving screed. The paving screed heating device preferably comprises a series of heating bars that are fastened on the parts to be heated.

The generator is in particular configured for the creation of an alternating current with a voltage of 230 V or 400 V as well as 50 or 60 Hz. The generator feeds the alternating current into a power supply network of the road paver, in which in particular the power line for the paving screed is integrated.

The sender integrated in the network preferably is or comprises a microprocessor that is disposed on the paving screed and that is functionally connected to the section of the power line, for example through an adapter, and that is configured to modulate at least one operating parameter of the paving screed, preferably a state of wear of a (supplementary) component of the paving screed, to a carrier frequency and to send the carrier frequency including the operating parameter that is modulated to it to the receiver via the section of the power line. In this process, the operating parameter can in particular relate to a temperature, a pressure value, a rotational speed, an adjustment track, a movement sequence, a weight, a force and/or a distance measurement that can be adjusted in particular during the installation tour manually or automatically.

The microprocessor is in particular configured to synchronize the at least single operating parameter as a data signal with the carrier signal, whereby the microprocessor uses in particular the alternating voltage applied to the power line as a carrier signal/carrier frequency for its data transmission.

The microprocessor is preferably configured to modulate the data signal to the carrier signal by means of pulse-phase modulation. The modulation method enables a robust data transmission that is not susceptible to interference. Furthermore, the data signal can in practice be reliably transferred without a filter or amplifier along the network to the receiver of the road paver.

According to a further embodiment of the disclosure, the microprocessor is installed on a functional component that belongs to the paving screed and that is fastened detachably on the paving screed or at least functionally associated with this paving screed, whereby the microprocessor is formed to modulate at least one operating parameter of the functional component to a carrier frequency and to send the carrier frequency with the operating parameter that is modulated to it to the receiver via the section of the power line. This variant relates in particular to an expandable paving screed with functional components that are fastened on it in a mountable and detachable way and that are used as supplementary components for a defined function on the paving screed. The network for data transmission of the road paver can preferably be expanded to a random number of supplementary components connected to it, whereby the type and number of the detachably mounted functional supplementary components can depend on the place of use as well as on the purpose of use of the paving screed.

The functional component could for example be a paving screed heating device, a stepper engine that is installed on the paving screed, a hydraulic adjustment cylinder, a lateral slider, a broadening part, i.e., an extending unit of the paving screed, a sensor, a screed plate and/or a tamper stroke unit.

The receiver is preferably configured to identify the functional component when the functional component is fastened on the paving screed. For this purpose, the microprocessor could be configured to create a docking signal and to send such docking signal via the network to the receiver as soon as the functional component is installed on the paving screed. Therefore, the receiver knows which functional components are connected to the network. In this regard, the receiver could be configured to record the type of the connected functional component. Furthermore, a defined operating mode aligned to the functional component can preferably be activated by the receiver on this basis.

It is also useful to equip the microprocessor with an operating hour counter that is configured to record an operating period of the microprocessor and/or of the functional component on the paving screed. Based on the operating period of the operating hour counter, signs of wear can in particular be derived so that the network of the road paver obtains information via the microprocessor about when, if required, replacement of a functional component of the paving screed can be expected. Further, the microprocessor can be formed to generate a service signal at least at intervals as soon as a given amount of elapsed operating hours of a functional component is reached in order to notify—using the network—an operator of the road paver in time that replacement and/or maintenance of the utilized functional component is to be expected shortly.

In another variant of the disclosure, the microprocessor comprises at least one temperature sensor to record an operating temperature at the paving screed. The temperature sensor can for example be designed to record the temperature of a paving screed plain sheet, a hydraulic line, a heating bar, a tamper bar and/or a lateral slider. This is useful to maintain the functionality of the respective component and to avoid, if required, that paving mix will stick to the parts.

The paving screed preferably comprises a heating bar monitoring unit in which the microprocessor is installed in an integral way. The heating bar monitoring unit is preferably connected functionally to all heating bars installed in the paving screed and configured to monitor an operating state of the heating bars, in particular and operating temperature at such bars. The heating bar monitoring unit preferably comprises a plurality of lamps that are associated to the respective heating bars, whereby an operator can visually detect on the basis of the lamps whether and which heating bars of the paving screed are active. To improve the functionality of the heating bar monitoring unit, it can be connected to the network for data transmission via the microprocessor that is formed in it in an integral way. The signals sent from the microprocessor into the network of the road paver enable monitoring of the heating bars through the network, in particular on the receiver connected to it, in addition or as an alternative to the monitoring of the heating bars by means of the lamps that are installed directly on the heating bar monitoring unit.

According to a further embodiment, the functional component and/or the microprocessor installed on it has an error memory, whereby the microprocessor is formed to record a malfunction on the paving screed, in particular on the functional component, and to save the malfunction in the error memory. A malfunction can be an excess and/or underscore of a defined operating parameter that should actually be adjusted to the functional component. Likewise, the malfunction could translate into an at least temporary failure of the functional component. In particular, the error memory is an RFID tag.

The microprocessor preferably generates a warning signal, which is transferred in particular to the receiver via the network for data transmission, as soon as a defined number of error messages is reached on the error memory. It is also possible for the microprocessor to be formed in a way as to communicate with a portable error memory reader, whereby this device can be used at any time, i.e., both in the mounted as well as in the de-installed state of the functional component on the paving screed, to read out the error messages of the functional component that are stored on the error memory.

The error memory and/or microprocessor on the functional component can preferably be read out also after removal from the paving screed, e.g., at the building yard, in a currentless way.

The error memory, in particular the RFID tag, is preferably configured in a way that it can be read out by the error memory reader in an uncoupled, currentless state of the functional component from the paving screed, whereby the functional component is a sensor, an operating device and/or another paving screed component. In particular, status information, for example error states and/or operating hours of the functional component, can be read out in this process.

Furthermore, the error memory, in particular the RFID tag can be configured to automatically record status information of the functional component during the normal operation of the functional component installed on the paving screed. Therefore, the operating status of the respective functional component can constantly be maintained up to date on the error memory. In the currentless state of the functional component, i.e., after transfer of said component to the building yard and/or prior to bringing the functional component to the next construction site, the last saved operating status of the functional component can, in particular by means of a manual RFID reader, be read out easily, preferably in a contactless way. This occurs preferably without any contact and connection between the functional component on the manual RFID reader.

The energy required to read out the memory is thereby provided preferably through a so-called energy harvesting method between the RFID tag and the manual RFID reader. It would also be possible that data such as operating parameters, serial number, service data and/or other data relating to the operation of the functional component, is written by means of this method from the manual RFID reader into the error memory of the functional component. This can also occur if the functional component is fastened on the paving screed.

A possible option would also be to ensure, alternatively or in addition, that the status information of the respective functional component that is saved on the error memory can be saved via the network automatically or manually on an ignition key of the road paver that is connected to the control module. The ignition key could then be used as a portable storage medium from which the operators read out status information away from the construction site, for example at their office, for instance by means of the abovementioned manual RFID reader or by means of another reader, and can possibly allow for an exchange of functional components on the basis of such information.

In particular, the features associated before in connection with the error memory can be used in an advantageous way for the preparation of works; for example, it can be avoided that faulty functional components will be brought to a construction site and that their defect will only be detected there.

A further preferred variant of the disclosure provides for the network to be functionally connected to a tamper stroke adjustment unit that can be activated dynamically through the network on the basis of at least one operating parameter of the paving screed. The tamper hub adjustment unit can preferably be adjusted automatically at the same time, based on a modification of at least one operating parameter of the paving screed so that the tamper stroke adjustment unit can be adapted optimally to the respective installation situation.

In particular, nominal values to set at least one stepper engine of the variably adjustable tamper stroke adjustment unit can be transmitted through the network, whereby the nominal values are based in particular on temperature data of the paving material and/or the paving screed/functional component.

The network can in particular improve the functionality of the construction machine if the receiver is a control module of the construction machine, whereby the control module is a central operating device on an operating stand of the construction machine and/or a paving screed operating device that is disposed laterally on the paving screed. Preferably, the control module is formed in a way to indicate that data received through the network, for example by means of a screen. Hence, the operator has the possibility to view data of the network at the control module where he normally is during the installation work.

The central operating device and/or the paving screed operating device is preferably configured to use the data signals for feedback that are received through the network, i.e., for the activation of the respective functional components where the data signals come from, and/or for the activation of other functional components of the road paver. Hence, data transmission through the network does not only provide a basis for direct feedback control of the functional components that are read out, but also further processing of the received data signals for the activation of other functional components of the road paver, whereby a particularly great plurality of any functional components of the road paver can be interlinked and functionally connected to each other.

It is also possible that the network comprises a CAN bus at least in sections, which connects the control module for data transmission to the section of the power line that is integrated in the network. The CAN bus could potentially also establish a connection to the other actuators of the road paver in order to link such actuators to the control module. The CAN bus section ensures a particularly high data transmission rate.

According to a special embodiment of the disclosure, the network of the construction machine is configured to establish a data connection with an external network. The external network can for example be formed by another construction site vehicle, in particular a roller vehicle. Another possible option would be that the external network belongs to a central work monitoring station, which is meant to coordinate logistical processes, in particular material provision processes and/or spare part supplies to the construction site, based on the data signals sent out by the road paver in connection with the work preparation.

It would also be possible for the respective microprocessors of the functional components installed on the road paver to be formed to send service signals, in particular relating to signs of wear, error messages and/or operating times of the functional components, at intervals or continuously through the network of the road paver to the control module and/or to the external network so that service and maintenance works can be timed better.

Embodiments according to the disclosure may provide a particularly advantageous function when the network of the construction machine is designed for a bidirectional data transmission. Thereby, the respective microprocessors can both send data signals through the network as well as receive data signals through the network on whose basis the microprocessors can influence and/or even implement settings of at least one operating parameter on the functional component. Therefore it is possible to integrate the respective microprocessors through the network of the road paver in a control loop that is configured to compare actual values of the operating parameters of the functional components, which are sent by the microprocessors and that are contained in the data signals, with respective set values that are in particular deposited in the control module, and, on this basis, to send data signals, comprising at least a regulating variable, back to the respective microprocessors of the functional components in order to control the respective functional components. Due to this, the disclosure could be functionally integrated in an automated regulation system of the road paver.

It would also be conceivable for the network of the construction machine to be designed for a unidirectional data transmission. Therefore, operating parameters, service signals and/or warning signals could be sent from the respective microprocessors to the control module of the road paver without any problem.

Furthermore, the disclosure relates to the use of a part of a power line that, in case of a construction machine that is formed as a self-propelled road paver, supplies an electric consumer of a paving screed of the road paver with power as an integral part of a network for data transmission between at least one sender that is integrated in the network and at least one receiver that is integrated in the network. As an integral part of the network for the data transmission, the part of the power line consequently forms a double function due to the condition that it is used to conduct an electric current to the electric consumer of the paving screed in addition to the data transmission in the network of the road paver. On the basis of the existing power line, all actuators of the network can be data-connected to each other.

Embodiments according to the present disclosure are further described below with reference to the attached drawings.

BRIEF DESCRIPTION OF THE DRAWINGS

FIG. 3 is a schematic display of the network for data transmission that is integrated in the road paver according to the disclosure; and FIG. 4 is a schematic display of a microprocessor of a functional component.

DETAILED DESCRIPTION

As required, detailed embodiments are disclosed herein; however, it is to be understood that the disclosed embodiments are merely exemplary and that various and alternative forms may be employed. The figures are not necessarily to scale; some features may be exaggerated or minimized to show details of particular components. Therefore, specific structural and functional details disclosed herein are not to be interpreted as limiting, but merely as a representative basis for teaching one skilled in the art.

Figure 1:
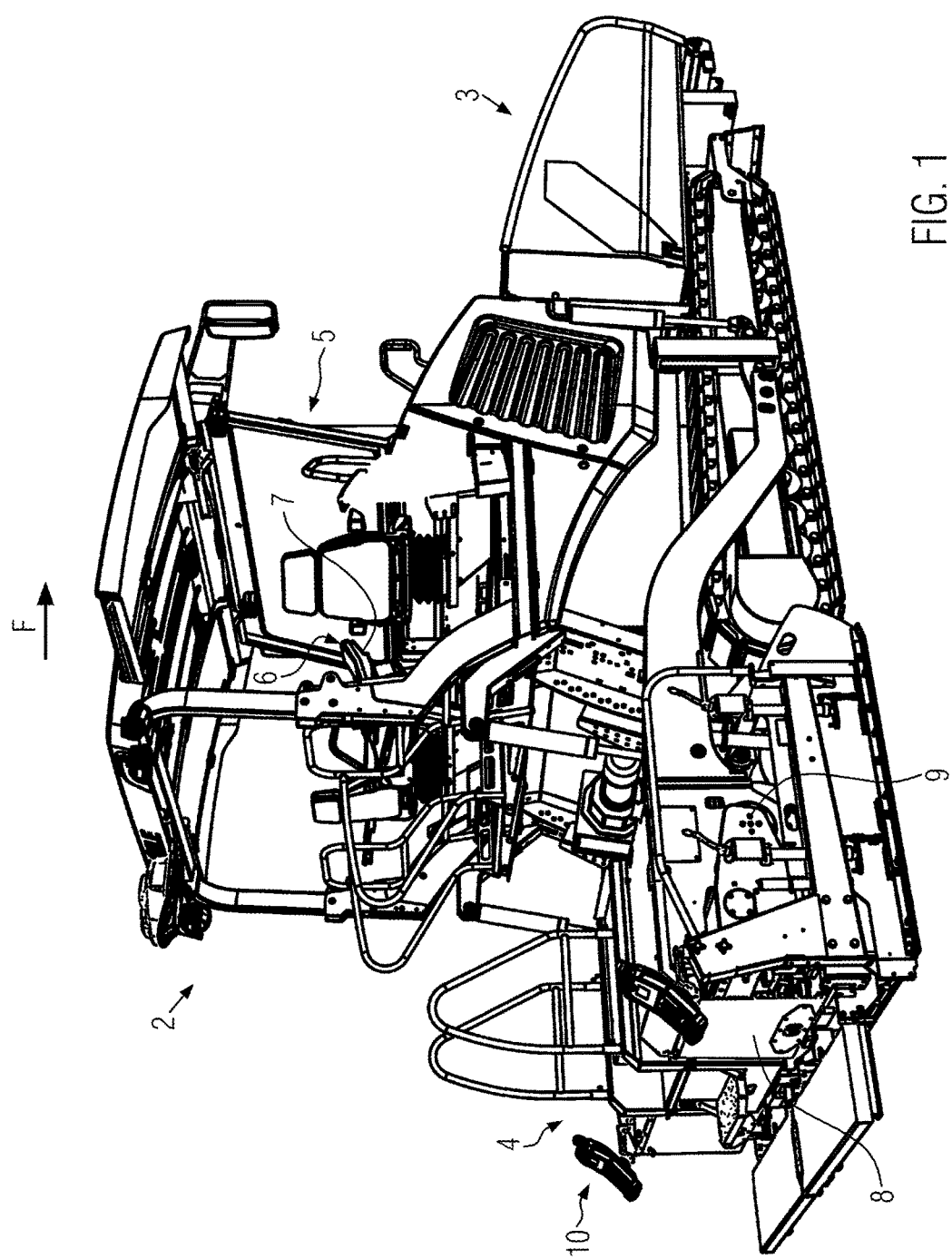
FIG. 1 is a perspective view of a self-propelled road paver according to the disclosure.

FIG. 1 shows a construction machine 1 that is formed as a self-propelled road paver 2. The road paver 2 comprises a material hopper 3 to take up paving mix, which is used to build a road surface layer by means of a paving screed 4 that is flexibly attached to the rear of the road paver 2. Further, the road paver 2 has an operating stand 5 from which an operator can control the operation of the road paver 2. To control the road paver 2, a control module 6 is to be provided for the operator on the operating stand 5 that forms a central operating device 7 for the operator by means of which he can both monitor as well as control operating functions of the road paver 2.

According to FIG. 1, the paving screed 4 is formed as an expandable paving screed that comprises a fundamental screed 8 as well as expandable screed parts 9 that are adjustable in relation to the fundamental screed 8 laterally to the direction of travel F in order to set the paving screed 4 with regard to a desired installation width for the new road surface.

In addition, FIG. 1 shows that two paving screed operating devices 10 are disposed on the left and on the right of the paving screed 4. The paving screed operating devices 10 are configured to control an operation of the paving screed 4, in particular the operation of functional components 16 (see FIGS. 2 and 3) attached to it, as well as to indicate to an operator on the paving screed how a plurality of operating parameters are set during the installation on the paving screed 4/the functional components 16.

In FIG. 1, the road paver 2 is formed as a tracked paver. Without deviating from the inventive idea, the road paver 2 displayed in FIG. 2 is formed as a wheeled paver.

Figure 2:
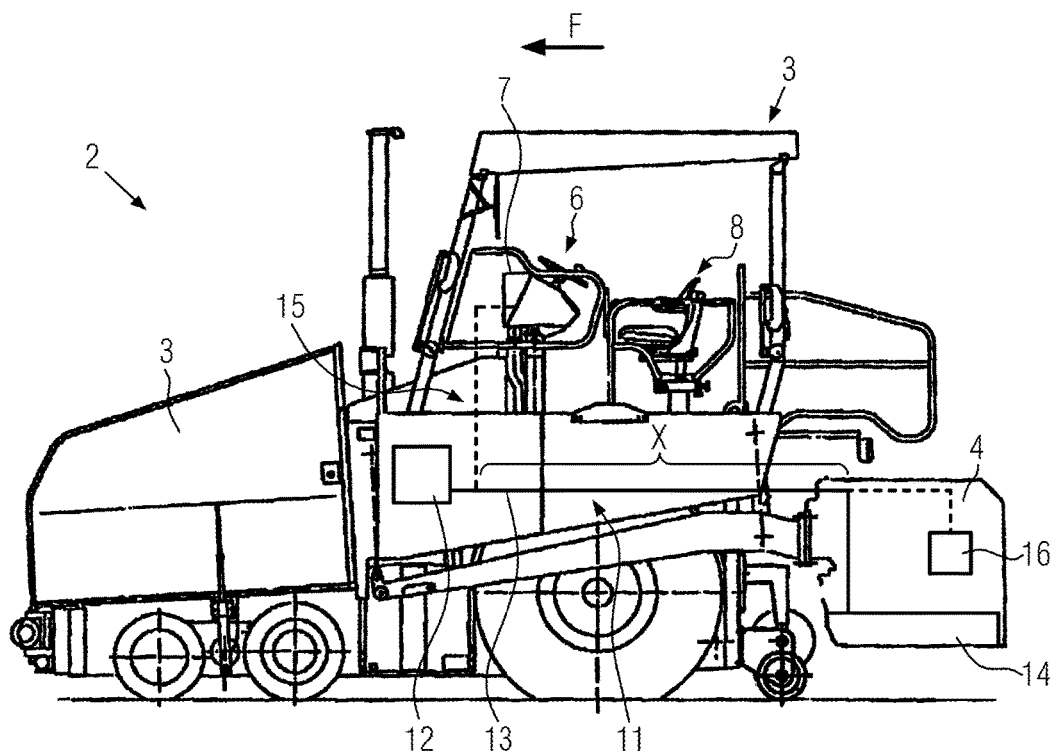
FIG. 2 is a lateral view of a road paver according to the disclosure.

FIG. 2 schematically displays a power supply network 11 in which a generator 12 supplies an electric consumer 14 of the paving screed 4 with power through a power line 13. In addition, FIG. 2 schematically displays a dotted illustration of a network 15 for data transmission between the central operating device 7 as well as a functional component 16 that is disposed on the paving screed 4.

Moreover, FIG. 2 shows that a section X of the power line 13 for data transmission is functionally integrated in the network 15. The network 15 therefore uses the cable section X of the power line 13 for data transmission, whereby the cabling of the network 15 and of the power supply grid 11 can be reduced altogether.

FIG. 3 shows a schematic display of the coupling according to the disclosure of the network 15 for data transmission with the power supply network 11 along the section X of the power line 13, which is used both for power supply of the electric consumers 14 on the paving screed 4 as well as for data transmission between the control module 6 and the functional components 16 on the paving screed 4. This facilitates in particular the establishment of the network 15 for data transmission as this network can access a power line section X for data transmission that is available on the road paver 2 anyway.

The functional components 16 to be installed on the paving screed 4 form a sender S in the network 15. The control module 6 forms a receiver E in the network 15, whereby the receiver E is connected to the sender S via a bus B for data transmission that is illustrated in a dotted way. The bus B comprises the section X of the power line 13 for data transmission as well as, if required, further data signal cables, for example CAN bus sections, in order to connect other units to the network.

The functional components 16 can exist as add-on parts that belong to the paving screed 4, that can be fastened detachably on the paving screed 4 and that can be installed on the paving screed 4 depending on the purpose of use of the paving screed 4 to perform a function. The functional components 16 are configured to perform respectively a defined number of operating functions on the paving screed 4. Further, the functional components 16 can record operating parameters during the operation of the road paver 2 on themselves and/or at another point of the paving screed 4. To record and process the respective operating parameters, each of the functional components 16 contains at least one microprocessor 17 that is formed to modulate at least one operating parameter, which is recorded by the functional component 16, as a data signal to the alternating voltage of the power supply grid 11 that is created as a carrier signal by the generator 12.

The data signals modulated to the alternating current as a carrier signal can be sent by the microprocessor 17 through the network 15, in particular through the section X, to the control module 6. Based on this, the control module 6 can send control signals through the network 15 to the respective functional components 6 either in a backward direction and/or to other functional units of the road paver 2 in order to activate them. Consequently, a bidirectional communication between the control module 6 and the respective functional components 6 on the paving screed 4 can take place through the network 15.

FIG. 4 shows the microprocessor 17 in a schematically enlarged display. According to FIG. 4, the microprocessor 17 comprises a temperature sensor 18 that is configured to measure at least one operating temperature on the paving screed 4. One of the electric consumers 14 shown in FIG. 3 can be formed as a paving screed heating device 19 in the disclosure. The paving screed heating device 19 can for example comprise a plurality of heating bars that are to be used for heating of defined parts of the paving screed 4 so that no surfacing material will stick to them. The temperature sensor 18 to be installed in the microprocessor 17 can be configured to record an operating temperature of the paving screed heating device 19 and to transmit it through the network 15 to the control module 6. For this purpose, the microprocessor 17 can be formed as a part of the heating bar monitoring unit 22 (see FIG. 3).

Furthermore, FIG. 4 shows that the microprocessor 17 has an operating hour counter 20. The operating hour counter 20 is configured to record an operating time at the functional component 16. Further, the operating hour counter 20 can be configured to save the operating time of the respective functional component 16 in order to make it available for diagnostic purposes during maintenance works of the functional component 16.

According to FIG. 4, the microprocessor 17 also comprises an error memory 21 that is designed to save error messages on the functional component 16. The error memory 21 can also be arranged as a separate component on the functional component 16. In particular, the error memory 21 is available as a RFID tag that can be read out for diagnostic purposes at any time by means of a portable error memory reader.

The heating bar monitoring unit 22 from FIG. 3 is configured to monitor a temperature of the paving screed heating device 19, in particular of the heating bars used in it. Based on measurements of the heating bar monitoring unit 22, for example by the temperature sensor 18, the control module 6 can generate preferably at least one control variable by means of which a tamper stroke adjustment unit 23, in particular a stepper engine 28 of it, can be activated through a data bus P illustrated as a dashed/dotted line. The tamper stroke adjustment unit 23 is to be installed on the paving screed 4 and configured to set a stroke path Z of a tamper bar 24 in order to obtain a defined degree of compaction in the surfacing material to be installed.

Furthermore, it is indicated by a double arrow 25 in FIG. 3 that the network 15 is configured for a bidirectional data exchange.

FIG. 3 further shows that the network 15 of the road paver 2 is functionally connected to an external network 26. By means of the external network 26, the road paver 2 can be connected to another construction site vehicle 27, for example a roller vehicle, for data transmission. It would also be possible that the road paver 2 can establish a data connection via the external network 26 to a central planning station 30 from where logistical material supply processes and/or spare part deliveries for worn or faulty functional components 16 can be coordinated based on the data transmission.

In the disclosure, the section X of the power line 13 has a double function. On one hand, it forms an integral part of the power supply grid 11 in order to supply the electric consumers 14 on the paving screed 4 with electric current, and on the other hand the section X forms an integral part of the network 15 for data transmission between the functional components 16 arranged on the paving screed 4 and the control module 6 of the road paver 2. The alternating current that is transferred between the generator 12 and the electric consumers 14 by means of the power line 13 is used by the network 15 as a carrier signal/carrier frequency for data transmission. The operating parameters of the functional component 16 that are recorded by means of the microprocessor 17 are synchronized with the carrier signal as data signals, i.e., modulated to the carrier signal by means of the microprocessor 17 and sent to the control module 6 along the data bus B, in particular along the jointly used section X.

The control module 6 is designed to demodulate the received data signals and to display them, if required, to an operator. As an option or in addition, the control module 6 can be configured to use the received and demodulated data signals for a feedback control of operating parameters on the functional components 16 or to control other functional components of the road paver 2.

FIG. 3 also shows that the paving screed operating device 10 can be connected to the network 15 for data transmission. This is not necessarily required but can increase the functionality of the road paver 2. In particular, comparable functions can be performed with regard to the control module 6 by means of the paving screed operating device 10. The paving screed operating device 10 thereby receives data signals sent from the functional components 16 through the network 15, in particular via a part of the section X.

The control module 6 and each paving screed operating device 10 may include suitable hardware and/or software so that the control module 6 may be used to control operation of the road paver 2 and so that each paving screed operating device 10 may be used to control operation of the paving screed 4. For example, the control module 6 and each paving screed operating device 10 may include a programmable device (e.g., microprocessor) and a memory or storage for storing computer executable instructions (e.g., code) that are executable by the programmable device for controlling operation of the programmable device and for performing the particular algorithms represented by the functions and/or operations described herein.

The inventive idea of using a section of the power line 13, which is disposed on the road paver 2 anyway, as an integral part in a network 15 for data transmission can also be used in other construction machine types, in particular in a feeder for the road paver 2.

While exemplary embodiments are described above, it is not intended that these embodiments describe all possible forms according to the disclosure. The words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A self-propelled construction machine comprising:
    a paving screed for installation of a road surface, the paving screed including at least one electric consumer;
    a power line for supplying power to the at least one electric consumer of the paving screed;
    a network for data transmission between a sender integrated in the network and a receiver integrated in the network; and
    a generator connected to the power line;
    wherein at least one section of the power line is integrated in the network and configured for data transmission between the sender and the receiver, wherein the at least one electric consumer comprises a paving screed heating device that is connected to the generator through the power line, wherein the generator and the powerline are configured to supply alternating current to the paving screed heating device, wherein the sender comprises a microprocessor installed on a functional component that belongs to the paving screed and that is detachably fastened on a body of the paving screed, and the microprocessor is connected to the at least one section of the power line and configured to modulate at least one operating parameter of the functional component to a carrier frequency and to send the carrier frequency including the at least one operating parameter modulated to it to the receiver through the at least one section of the power line, wherein the microprocessor has an error memory and is configured to save a malfunction associated with the functional component in the error memory, and wherein the error memory is readable out in a currentless way even after removal of the functional component from the body of the paving screed.

2. The construction machine according to claim 1 wherein the receiver is configured to identify the functional component when the functional component is fastened on the body of the paving screed.

3. The construction machine according to claim 1 wherein the microprocessor has an operating hour counter that is configured to record an operating time of the microprocessor and/or of the paving screed.

4. The construction machine according to claim 1 wherein the microprocessor comprises at least one temperature sensor to record an operating temperature on the paving screed.

5. The construction machine according to claim 1 wherein the paving screed comprises a heating bar monitoring unit in which the microprocessor is installed.

6. The construction machine according to claim 1 wherein the network is connected to a tamper stroke adjustment unit that can be activated automatically through the network based on at least one operating parameter of the paving screed.

7. The construction machine according to claim 1 wherein the receiver comprises a control module of the construction machine, and wherein the control module is a central operating device on an operating stand of the construction machine or a paving screed operating device that is disposed laterally on the paving screed.

8. The construction machine according to claim 7 wherein the network of the construction machine comprises a CAN bus at least in a sectional way that connects the control module for data transmission with the at least one section of the power line that is integrated in the network.

9. The construction machine according to claim 1 wherein the network of the construction machine is configured to establish a data connection with an external network.

10. The construction machine according to claim 1 wherein the network of the construction machine is designed for bidirectional or for unidirectional data transmission.

11. The construction machine according to claim 1 wherein the error memory comprises an RFID tag.

12. A method of providing power to an electric consumer of a paving screed of a self-propelled road paver, the method comprising:
providing alternating current through a cable section of a power line that is associated with the electric consumer, wherein the cable section forms an integral part of a network for data transmission between a sender integrated in the network and a receiver integrated in the network, wherein the sender comprises a microprocessor installed on a functional component that belongs to the paving screed and that is detachably fastened on a body of the paving screed, and the microprocessor is connected to the cable section of the power line and has an error memory, wherein the microprocessor is configured to save a malfunction associated with the functional component in the error memory, and the error memory is readable out in a currentless way even after removal of the functional component from the body of the paving screed, and wherein the method further comprises:
modulating, by the microprocessor, at least one operating parameter of the functional component to a carrier frequency; and
sending the carrier frequency including the at least one operating parameter modulated to it to the receiver through the cable section of the power line.

13. The method of claim 12 wherein the electric consumer comprises a paving screed heating device.

14. The method of claim 12 wherein the road paver comprises a generator for generating the alternating current.

15. The method of claim 14 wherein the electric consumer comprises a paving screed heating device.

16. The method according to claim 12 wherein the error memory comprises an RFID tag.

* * * * *